(12) United States Patent
Yu

(10) Patent No.: US 12,035,230 B2
(45) Date of Patent: Jul. 9, 2024

(54) METHOD AND APPARATUS FOR ATTACHING USER EQUIPMENT TO A NETWORK SLICE

(71) Applicant: ZTE CORPORATION, Guangdong (CN)

(72) Inventor: Wantao Yu, Guangdong (CN)

(73) Assignee: ZTE CORPORATION, Guangdong (CN)

(*) Notice: Subject to any disclaimer, the term of this patent is extended or adjusted under 35 U.S.C. 154(b) by 594 days.

(21) Appl. No.: 17/291,318

(22) PCT Filed: Nov. 6, 2018

(86) PCT No.: PCT/CN2018/114206
§ 371 (c)(1),
(2) Date: May 5, 2021

(87) PCT Pub. No.: WO2020/093247
PCT Pub. Date: May 14, 2020

(65) Prior Publication Data
US 2022/0007277 A1    Jan. 6, 2022

(51) Int. Cl.
*H04W 48/18* (2009.01)
*H04W 12/06* (2021.01)
(52) U.S. Cl.
CPC ........... *H04W 48/18* (2013.01); *H04W 12/06* (2013.01)
(58) Field of Classification Search
CPC ...... H04W 48/18; H04W 12/06; H04W 60/00
See application file for complete search history.

(56) References Cited

U.S. PATENT DOCUMENTS

| 11,690,005 | B2 * | 6/2023 | Qiao | H04W 28/24 |
| | | | | 370/329 |
| 11,696,213 | B2 * | 7/2023 | Prakash | H04W 48/00 |
| | | | | 455/434 |

(Continued)

FOREIGN PATENT DOCUMENTS

| CN | 106572517 A | 4/2017 |
| CN | 107347202 A | 11/2017 |

(Continued)

OTHER PUBLICATIONS

International Search Report for the International Patent Application No. PCT/CN2018/114206, mailed Aug. 5, 2019, 2 pages.

(Continued)

*Primary Examiner* — Michael J Moore, Jr.
*Assistant Examiner* — Prenell P Jones
(74) *Attorney, Agent, or Firm* — KDW Firm PLLC

(57) ABSTRACT

A method for attaching user equipment, UE, with a network slice supported by one or more network entities is described herein. A user parameter and subscriber-related information identifying the UE are sent from the UE to at least one of the one or more network entities. A network parameter is sent to the UE. A temporary network slice identifier is generated at (i) the UE and at (ii) at least one of the one or more network entities for use in attaching the UE to the network slice. The temporary network slice identifier is generated based on (a) the user parameter, (b) the network parameter, and (c) subscriber-related information. The temporary network slice identifier generated at the UE may be identical to the temporary network slice identifier generated at the at least one network entity.

20 Claims, 7 Drawing Sheets

(56) References Cited

U.S. PATENT DOCUMENTS

| | | | | |
|---|---|---|---|---|
| 2013/0057388 | A1* | 3/2013 | Attanasio | G06Q 50/26 340/10.1 |
| 2014/0223095 | A1* | 8/2014 | Storm | G06F 3/067 711/114 |
| 2016/0330748 | A1* | 11/2016 | Bindrim | H04L 63/20 |
| 2017/0141933 | A1* | 5/2017 | Senda | H04L 43/0811 |
| 2017/0141973 | A1* | 5/2017 | Vrzic | H04W 76/11 |
| 2017/0164349 | A1* | 6/2017 | Zhu | H04W 72/51 |
| 2017/0318450 | A1* | 11/2017 | Salkintzis | H04W 60/04 |
| 2017/0332421 | A1* | 11/2017 | Sternberg | H04W 12/069 |
| 2017/0339688 | A1* | 11/2017 | Singh | H04W 72/51 |
| 2018/0007552 | A1* | 1/2018 | Bae | H04L 63/083 |
| 2018/0074744 | A1* | 3/2018 | Kazi | G06F 3/0634 |
| 2018/0242198 | A1* | 8/2018 | Choi | H04L 67/51 |
| 2018/0270744 | A1* | 9/2018 | Griot | H04W 88/18 |
| 2018/0310169 | A1* | 10/2018 | Wang | H04L 61/5007 |
| 2018/0317163 | A1* | 11/2018 | Lee | H04W 8/02 |
| 2019/0021047 | A1* | 1/2019 | Zong | H04W 40/24 |
| 2019/0029075 | A1* | 1/2019 | Wang | H04L 63/0876 |
| 2019/0053104 | A1* | 2/2019 | Qiao | H04M 15/66 |
| 2019/0053147 | A1* | 2/2019 | Qiao | H04W 48/18 |
| 2019/0056996 | A1* | 2/2019 | Resch | G06F 11/1088 |
| 2019/0182875 | A1* | 6/2019 | Talebi Fard | H04W 76/11 |
| 2019/0230584 | A1* | 7/2019 | Lou | H04W 48/16 |
| 2019/0387401 | A1* | 12/2019 | Liao | H04W 80/10 |
| 2019/0394279 | A1* | 12/2019 | Dao | H04W 48/04 |
| 2020/0053531 | A1* | 2/2020 | Myhre | H04W 48/18 |
| 2020/0084631 | A1* | 3/2020 | Zhang | H04W 12/106 |
| 2020/0145538 | A1* | 5/2020 | Qiao | H04M 15/8038 |
| 2020/0169951 | A1* | 5/2020 | Cai | H04W 4/24 |
| 2020/0287800 | A1* | 9/2020 | Xu | H04W 24/02 |
| 2020/0305001 | A1* | 9/2020 | Li | H04W 12/102 |
| 2020/0344679 | A1* | 10/2020 | Jin | H04W 36/0011 |
| 2020/0389844 | A1* | 12/2020 | Bihannic | H04L 41/5041 |
| 2021/0029579 | A1* | 1/2021 | Tiwari | H04W 48/06 |
| 2021/0044481 | A1* | 2/2021 | Xu | H04W 72/02 |
| 2021/0068073 | A1* | 3/2021 | Sivavakeesar | H04W 74/0833 |
| 2021/0084009 | A1* | 3/2021 | Du | H04L 45/74 |
| 2021/0084525 | A1* | 3/2021 | Takano | H04W 4/06 |
| 2021/0144674 | A1* | 5/2021 | Zhang | H04W 72/23 |
| 2021/0153077 | A1* | 5/2021 | Samdanis | H04W 48/18 |
| 2021/0160131 | A1* | 5/2021 | Maguire | H04L 41/0806 |
| 2021/0168594 | A1* | 6/2021 | Wu | H04W 88/16 |
| 2021/0168705 | A1* | 6/2021 | Fiorese | H04W 12/037 |
| 2021/0211510 | A1* | 7/2021 | Trossen | H04L 67/63 |
| 2021/0235288 | A1* | 7/2021 | Dao | H04W 24/08 |
| 2021/0329452 | A1* | 10/2021 | Ito | H04W 12/06 |
| 2021/0352465 | A1* | 11/2021 | Lee | H04W 4/40 |
| 2021/0385742 | A1* | 12/2021 | Liao | H04W 48/02 |
| 2022/0007277 | A1* | 1/2022 | Yu | H04W 60/00 |
| 2022/0070767 | A1* | 3/2022 | Qiao | H04M 15/8038 |
| 2022/0338065 | A1* | 10/2022 | Qiao | H04W 28/0268 |
| 2023/0006889 | A1* | 1/2023 | Thyagaturu | H04L 41/5054 |

FOREIGN PATENT DOCUMENTS

| | | |
|---|---|---|
| CN | 107580360 A | 1/2018 |
| CN | 107925587 A | 4/2018 |
| EP | 3462691 A1 | 4/2019 |
| WO | 2018126342 A1 | 7/2018 |

OTHER PUBLICATIONS

Gemalto N.V. "SA WG2 Meeting #118 S2-166754" Network Slice for Initial Attachment enabling Remote Subscription Management, Nov. 18, 2016.

China Mobile. "SA WG2Meeting #S2-117 S2-165659" Update of Interim Agreements on Network Slicing, Oct. 21, 2016.

Office Action for the Chinese Patent Application No. 2018800992889, mailed Feb. 11, 2022, 10 pages.

Search Report for the Chinese Patent Application No. 2018800992889, mailed Feb. 11, 2022, 3 pages.

* cited by examiner

METHOD AND APPARATUS FOR ATTACHING USER EQUIPMENT TO A NETWORK SLICE

CROSS-REFERENCES TO RELATED APPLICATION

This application is a national stage application filed under 35 U.S.C. 371 based on International Patent Application No. PCT/CN2018/114206, filed on Nov. 6, 2018, disclosure of which is incorporated herein by reference in its entirety.

TECHNICAL FIELD

The present disclosure relates to a method and apparatus for attaching user equipment to a network slice.

BACKGROUND

In traditional network architectures, such as in 3/4G networks, functional network entities may be protected based on the physical separation or isolation of the network entities.

However, newer network architectures, such as the 5G network architecture, make use of network function virtualization, NFV. In such networks, due to the deployment of NFV, some functional network entities are deployed in the form of virtual functional network entities on a cloudified infrastructure. Such networks therefore may not be able to rely on the physical separation of network entities to provide security protection.

SUMMARY

Aspects of the invention are as set out in the independent claims and optional features are set out in the dependent claims. Aspects of the invention may be provided in conjunction with each other and features of one aspect may be applied to other aspects.

In networks that use NFV, a virtual core network may be constructed based on network service requirements. This is known as a network slice, wherein one network slice forms one virtual core network to provide a mobile network access service for a group of user equipment (UE). Due to the introduction of the concept of network slices, the UE needs to further access the network slice after attachment to a network. In order for the user to choose and to attach to a particular network slice, network slice information such as a network slice identifier SliceID may be needed (although it will be understood that in certain cases, for example in emergency situations, a default network slice may be allocated). The UE or the provider of the network slice may use such network slice identifier SliceID to select the relevant functions within a certain network slice. However, if an attacker can correlate the network slice identifier with the subscription identifier of the UE, using this correlation it is possible for the attacker to identify a group of users that use the same network slice and perform a denial-of-service attack. Embodiments of the disclosure may provide solutions to protect the privacy of the network slice identifier SliceID when the UE accesses the network in a communication system such as a 5G communication system.

A first aspect of the disclosure provides a method for attaching user equipment, UE, with a network slice supported by one or more network entities. The method is performed by a UE and comprises sending a user parameter, and subscriber-related information identifying the UE, to at least one of the one or more network entities. Optionally the method also comprises generating the user parameter at the UE. The method also comprises receiving a network parameter from at least one of the one or more network entities, and generating a temporary network slice identifier at the UE for use in attaching the UE to the network slice, the temporary network slice identifier generated based on (a) the user parameter, (b) the network parameter, and (c) subscriber-related information.

In this way, the privacy of a network slice identifier when a UE accesses a network slice in a communication system such as a 5G communication system may be protected.

In some examples the method further comprises sending network slice information identifying the network slice to which the UE wishes to attach the at least one network entity, and optionally wherein generating a temporary network slice identifier at the UE is based on (a) the user parameter, (b) the network parameter, (c) subscriber-related information and (d) the network slice information.

However in some examples it will be appreciated that the network slice information may already have been sent by the UE or received by the network entity. For example, the network entity may perform a lookup operation to obtain the network slice information. For example, generating a temporary network slice identifier at the UE may be based on (a) the user parameter, (b) the network parameter, (c) subscriber-related information and (d) the network slice information already received by the network entity, previously sent by the UE and/or obtained via the lookup operation.

Another aspect of the disclosure provides a method for attaching user equipment, UE, with a network slice supported by one or more network entities, the method performed by at least one of the one or more network entities. The method comprises receiving, at the network entity, a user parameter, and subscriber-related information identifying the UE, from the UE, and generating a temporary network slice identifier at the at least one network entity for use in attaching the UE to the network slice, wherein the temporary network slice identifier is generated based on (a) the user parameter, (b) a network parameter, and (c) subscriber-related information.

In some examples the method further comprises receiving network slice information identifying the network slice to which the UE wishes to attach, and optionally wherein generating a temporary network slice identifier at the UE is based on (a) the user parameter, (b) the network parameter, (c) subscriber-related information and (d) the network slice information.

However in some examples it will be appreciated that the network slice information may already have been sent by the UE or received by the network entity. For example, the network entity may perform a lookup operation to obtain the network slice information. For example, generating a temporary network slice identifier at the UE may be based on (a) the user parameter, (b) the network parameter, (c) subscriber-related information and (d) the network slice information already received by the network entity, previously sent by the UE and/or obtained via the lookup operation.

Another aspect of the disclosure provides a method for attaching user equipment, UE, with a network slice supported by one or more network entities. The method comprises sending a user parameter, and subscriber-related information identifying the UE, from the UE to at least one of the one or more network entities. Optionally the method comprises generating a user parameter at the UE and/or generating a network parameter at least one of the one or more network entities and sending the network parameter from at least one of the one or more network entities to the UE. The method further comprises generating a temporary network slice identifier at (i) the UE and at (ii) at least one of the one or more network entities based on (a) the user parameter, (b) the network parameter, and (c) subscriber-related information, wherein the temporary network slice identifier generated at the UE has a one-to-one mapping with (for example is identical to) the temporary network slice identifier generated at the at least one network entity.

In this way, the privacy of a network slice identifier when a UE accesses a network slice in a 5G communication system may be protected.

In some examples the method further comprises sending network slice information identifying the network slice to which the UE wishes to attach from the UE to the at least one network entity, and optionally wherein generating a temporary network slice identifier at the UE is based on (a) the user parameter, (b) the network parameter, (c) subscriber-related information and (d) the network slice information.

However in some examples it will be appreciated that the network slice information may already have been sent by the UE or received by the network entity. For example, the network entity may perform a lookup operation to obtain the network slice information. For example, generating a temporary network slice identifier at the UE may be based on (a) the user parameter, (b) the network parameter, (c) subscriber-related information and (d) the network slice information already received by the network entity, previously sent by the UE and/or obtained via the lookup operation.

Another aspect of the disclosure provides a computer readable non-transitory storage medium comprising a program for a computer configured to cause a processor to perform any of the methods described above.

Another aspect of the disclosure provides a UE configured to attach to a network slice supported by one or more network entities. The UE comprises a memory and a processor, and wherein the processor is configured to load instructions from the memory to cause the processor to send a user parameter, subscriber-related information identifying the UE and optionally network slice information, to at least one of the one or more network entities. The UE also comprises a communication interface coupled to the processor, and is configured to receive a network parameter from at least one of the one or more network entities. In response, the processor is configured to generate a temporary network slice identifier for use in attaching the UE to the network slice, the temporary network slice identifier generated based on (a) the user parameter, (b) the network parameter, (c) subscriber-related information and optionally (d) the network slice information.

Another aspect of the disclosure provides a network entity, for example a virtualized network entity, configured to attach user equipment, UE, with a network slice supported by the network entity. The network entity is coupled to a communication interface and comprises a processor and a memory, wherein the processor is configured to load instructions from the memory to cause the processor to receive at the network entity, a user parameter, subscriber-related information identifying the UE and optionally network slice information, from the UE, and in response, generate a temporary network slice identifier for use in attaching the UE to the network slice, wherein the temporary network slice identifier is generated based on (a) the user parameter, (b) a network parameter, (c) subscriber-related information and optionally (d) the network slice information.

In the context of the disclosure it will be understood that a typical network slice comprises a group of virtualized core network functions, such as:
  a slice control plane unit, which is mainly responsible for functions related to the mobility, session management, and authentication certification of the slice;
  a slice user plane unit which mainly provides a user with user resources for the slice;
  a slice policy control unit which is responsible for the function of user policy; and
  a slice charging unit which is responsible for a charging function for the user.

The functions of the network slice may be determined by a network operator according to the requirements and the operator policy. For example, some network slices may comprise a dedicated forwarding plane in addition to control plane functions; however, some network slices may only comprise some basic control plane functions, and other core network-related functions are shared with other network slices. A network slice may be created, modified, or deleted based on the requirements. One piece of UE may also receive services from different network slices at the same time.

It will also be understood that the examples contained within this disclosure are described in the context of virtualized network entities supporting a 5G network, although it will be understood that aspects of the disclosure may also be applicable to other networks, for example other networks that make use of network function virtualization, NFV. The methods described in the disclosure may be applicable to network entities that are physical and/or virtual network entities (or a combination of both), and it will be understood that any one or more of the network entities may be provided on the same physical entity (such as a server) or on separate physical entities.

The network slice information may comprise at least one of:
  a name;
  an instance name; and
  a network slice identifier SliceID.

The user parameter may comprise a random number. The network parameter may additionally or alternatively comprise a random number.

The subscriber-related information may comprise at least one of a Mobile Subscriber Identification Number, MSIN, National Mobile Subscriber identity, NMSI, International Mobile Subscriber Identity, IMSI, Temporary Mobile Subscriber Identity, TMSI, Globally Unique Temporary UE Identity, GUTI, Subscription Permanent Identifier, SUPI, Subscription Concealed Identifier, SUCI, Network Access Identifier, NAI, and International Mobile station Equipment Identity, IMEI.

BRIEF DESCRIPTION OF DRAWINGS

Embodiments of the disclosure will now be described, by way of example only, with reference to the accompanying drawings, in which:

FIG. 7 comprises FIGS. 7A and 7B, where

DETAILED DESCRIPTION

The following detailed description illustrates example embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
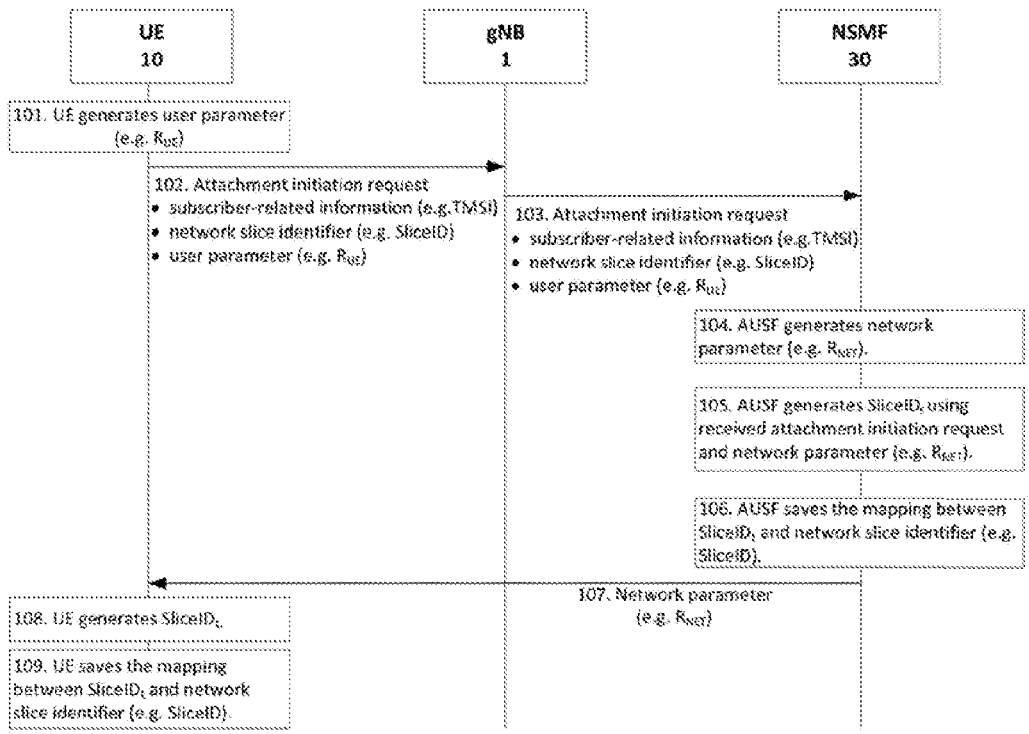
FIG. 1 is a sequence diagram of an example of a computer-implemented method for enabling attachment of user equipment, UE, with a network slice.

FIG. 1 shows a sequence diagram of an example of a computer-implemented method for enabling attachment of user equipment, UE 10, with a network slice. The process shown in FIG. 1 may be performed using apparatus such as that shown in FIGS. 8 to 12 and as described below. As shown in FIG. 1, the computer-implemented method comprises generating 101 a user parameter Run at the UE 10. The UE 10 sends the user parameter Run, and subscriber-related information identifying the UE 10, as part of an attachment initiation request from the UE 10 to at least one of the one or more network entities. The subscriber-related information comprises at least one of a Mobile Subscriber Identification Number, MSIN, National Mobile Subscriber identity, NMSI, International Mobile Subscriber Identity, IMSI, Temporary Mobile Subscriber Identity, TMSI, Globally Unique Temporary UE Identity, GUTI, Subscription Permanent Identifier, SUPI, Subscription Concealed Identifier, SUCI, Network Access Identifier, NAI, and International Mobile station Equipment Identity, IMEI.

In some examples, for instance in an emergency, UEs may attach to a network without an IMSI (e.g. UICCless UE) or with an unauthenticated IMSI, In such cases the IMEI may be used instead of the IMSI to identify the UE.

In the example shown in FIG. 1, the UE 10 sends 102 the user parameter Run, subscriber-related information identifying the UE, and network slice information to a next generation base station, gNodeB or gNB 1. The network slice information identifies the network slice to which the UE wishes to attach. In the examples shown, the network slice information is a network slice identifier, SliceID.

The gNB 1 forwards the attachment initiation request (and so sends 103 the user parameter $R_{UE}$, subscriber-related information identifying the UE, and the SliceID) on to a network entity. The network entity may be network entity deployed in the form of a virtual functional network entity on a cloudified infrastructure. In the example shown in FIG. 1, the network entity is an authentication server function, AUSF 20. In the example shown, the AUSF 20 and the gNB 1 are network entities supporting a 5G network, although it will be understood that aspects of the disclosure may also be applicable to other networks, for example other networks that make use of network function virtualization, NFV.

The network entity (which in this example is the AUSF 20) receives the attachment initiation request comprising the user parameter, the subscriber-related information identifying the UE 10 and the SliceID from the UE 10. In response to receiving the attachment initiation request, the AUSF 20 generates 104 a network parameter $R_{NET}$. The AUSF 20 then generates 105 a temporary network slice identifier $SliceID_t$ at the at least one network entity based on (a) the user parameter $R_{UE}$, (b) the network parameter $R_{NET}$, (c) subscriber-related information (preferably the subscriber-related information comprises the IMSI), and in the example shown (d) the network slice information (which in the examples shown is the network slice identifier SliceID), and maintains a relationship between the network slice information (such as the SliceID) and the temporary network slice identifier $SliceID_t$, for example by saving 106 a mapping between the SliceID and the temporary network slice identifier $SliceID_t$. The AUSF 20 then sends 107 the network side parameter $R_{NET}$ to the UE 10.

The UE 10 receives the network parameter from the AUSF 20 and generates 108 a temporary network slice identifier at the UE based on (a) the user parameter $R_{UE}$, (b) the network parameter $R_{NET}$, (c) subscriber-related information (preferably the subscriber-related information comprises the IMSI), and in the example shown (d) the network slice information (which in the example shown is the network slice identifier SliceID), and also maintains a relationship between the network slice information (such as the SliceID) and the temporary network slice identifier $SliceID_t$, for example by saving 109 a mapping between the SliceID and the $SliceID_t$.

The UE 10 and AUSF 20 may generate the same temporary network slice identifier $SliceID_t$. For example, the UE 10 and AUSF 20 may have the same generation algorithm such that the temporary network slice identifier $SliceID_t$ generated by the UE 10 and the AUSF 20 are identical. In other examples, there may be a mathematical relationship between the temporary network slice identifier $SliceID_t$ generated by the UE 10 and the AUSF 20—for example the temporary network slice identifier $SliceID_t$ generated by the UE 10 may be a multiple of the temporary network slice identifier $SliceID_t$ generated by the AUSF 20. In such examples the relationship between the temporary network slice identifier $SliceID_t$ generated by the UE 10 and the AUSF 20 may be stored, for example at the UE and the AUSF. However, it will also be understood that the relationship between the temporary network slice identifier $SliceID_t$ generated by the UE and the AUSF may be stored elsewhere and received or retrieved by the UE and/or the AUSF.

The UE 10 and AUSF 20 may then use the temporary network slice identifier SliceID$_t$ to attach the UE 10 to the network slice, as will be described in more detail below. For example, the UE 10 may communicate with the AUSF 20 to use the temporary network slice identifier SliceID$_t$ to attach the UE 10 to the network slice.

A single UE 10 may also receive services from different network slices at the same time. It will therefore be understood that in some examples the steps described above may be repeated a plurality of times so as to generate a plurality of temporary network slice identifiers at the UE 10, and each of the plurality of temporary network slice identifiers may be used to attach the UE 10 to a respective one of a corresponding plurality of network slices.

Figure 2:
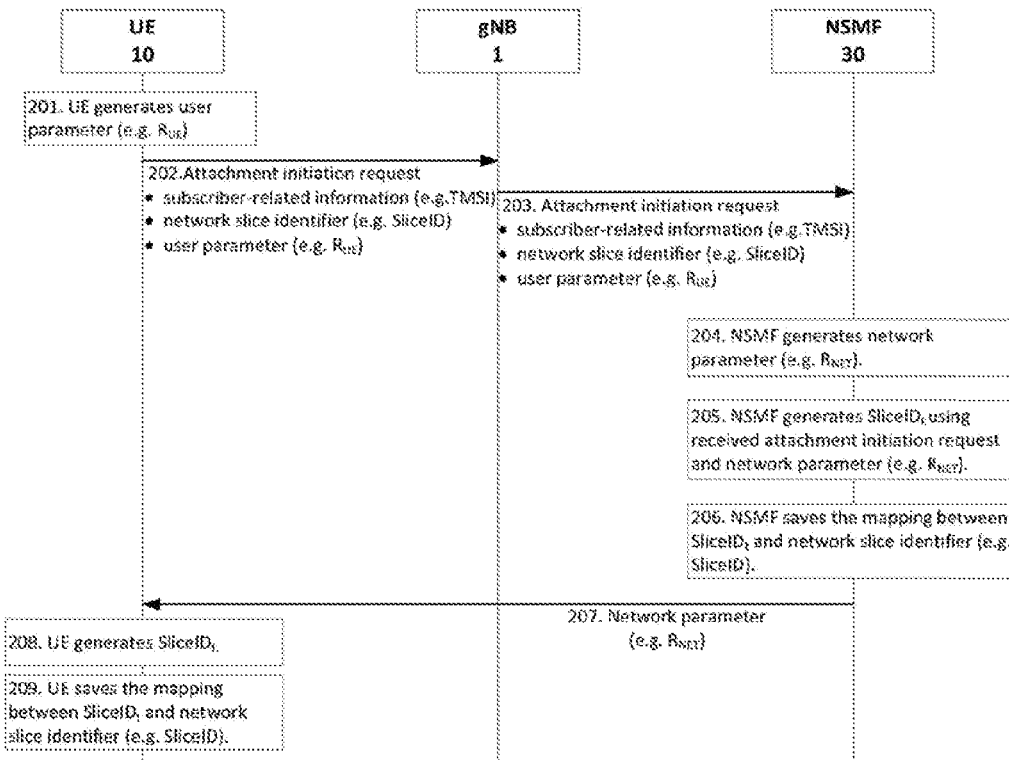
FIG. 2 is a sequence diagram of an example of a computer-implemented method for enabling attachment of user equipment, UE, with a network slice.

It will of course be understood that the network entity need not specifically be the AUSF 20. As shown in FIG. 2, the network entity may be a network slice management function, NSMF 30. For example, as shown in FIG. 2, the computer-implemented method comprises generating 201 a user parameter R$_{UE}$ at the UE 10. The UE 10 sends the user parameter R$_{UE}$, and subscriber-related information identifying the UE 10, as part of an attachment initiation request from the UE 10 to at least one of the one or more network entities. In the example shown the UE 10 sends 202 the user parameter R$_{UE}$, subscriber-related information identifying the UE, and a network slice identifier SliceID, to a next generation base station, gNodeB or gNB 1. The gNB 1 forwards on the attachment initiation request and so sends 203 the user parameter, subscriber-related information identifying the UE, and the SliceID on to the NSMF 30. In the example shown, the NSMF 30 and the gNB 1 are network entities supporting a 5G network, although it will be understood that aspects of the disclosure may also be applicable to other networks, for example other networks that make use of network function virtualization, NFV.

The NSMF 30 receives, at the network entity, the attachment initiation request comprising the user parameter R$_{UE}$, the subscriber-related information identifying the UE 10 and the network slice information (which in the example shown is the network slice identifier SliceID) from the UE 10. In response to receiving the attachment initiation request, the NSMF 30 generates 204 a network parameter R$_{NET}$. The NSMF 30 then generates 205 a temporary network slice identifier SliceID$_t$ at the at least one network entity based on (a) the user parameter R$_{UE}$, (b) the network parameter R$_{NET}$, (c) subscriber-related information (preferably the subscriber-related information comprises the IMSI), and in the example shown (d) the network slice information (which in the example shown is the network slice identifier SliceID), and maintains a relationship between the network slice information (such as the SliceID) and the temporary network slice identifier SliceID$_t$, for example by saving 206 a mapping between the SliceID and the temporary network slice identifier SliceID$_t$. The NSMF 30 then sends 107 the network side parameter to the UE.

As with the example shown in FIG. 1, in the example of FIG. 2 the UE 10 receives the network parameter R$_{NET}$ from at least one of the one or more network entities and generates 208 a temporary network slice identifier at the UE 10 based on (a) the user parameter R$_{UE}$, (b) the network parameter R$_{NET}$, (c) subscriber-related information (preferably the subscriber-related information comprises the IMSI), and (d) the network slice information (which in the example shown is the network slice identifier SliceID), and also maintains a relationship between the network slice information (such as the network slice identifier SliceID) and the temporary network slice identifier SliceID$_t$, for example by saving 209 a mapping between the network slice identifier SliceID and the temporary network slice identifier SliceID$_t$.

In the examples shown, the UE 10 and NSMF 30 generate the same temporary network slice identifier SliceID$_t$. For example, the UE 10 and NSMF 30 may have the same generation algorithm such that the temporary network slice identifier SliceID$_t$ generated by the UE 10 and the NSMF 30 are identical.

The UE 10 and NSMF 30 may then use the temporary network slice identifier to attach the UE 10 to the network slice, as will be described in more detail below with reference to FIG. 3. For example, the UE 10 may communicate with the NSMF 30 to use the temporary network slice identifier SliceID$_t$ to attach the UE 10 to the network slice.

It will of course be understood that generating a user parameter R$_{UE}$ at the UE 10 is optional. For example, the UE may receive the user parameter R$_{UE}$ from another entity. It will also be understood that generating the network side parameter R$_{NET}$ at the network entity, such as the AUSF 20 or NSMF 30, may be optional. For example, the network entity may receive the network parameter R$_{NET}$ from another network entity. In some examples the user parameter R$_{UE}$ may be generated at the UE 10 using a parameter generation algorithm. For convenience, the network entity, such as the AUSF 20 or NSMF 30, may use the same parameter generation algorithm as the UE 10, although it will be understood that in other examples the network entity such as the AUSF 20 or the NSMF 30 may use a different parameter generation algorithm to the parameter generation algorithm used by the UE 10. The parameter generation algorithm may be a random number generator.

It will also be understood that in some examples the UE 10 need not send a network slice identifier SliceID as part of the attachment initiation request. For example, in examples where the UE 10 does not send a network slice identifier SliceID as part of an attachment initiation request, the UE 10 may be allocated a default network slice as will be described in more detail below.

As described above with reference to FIG. 1, it will be understood that in some examples the steps described above with respect to FIG. 2 may be repeated a plurality of times so as to generate a plurality of temporary network slice identifiers at the UE 10, and may use each of the plurality of temporary network slice identifiers to attach the UE 10 to a respective one of a corresponding plurality of network slices.

Figure 3:
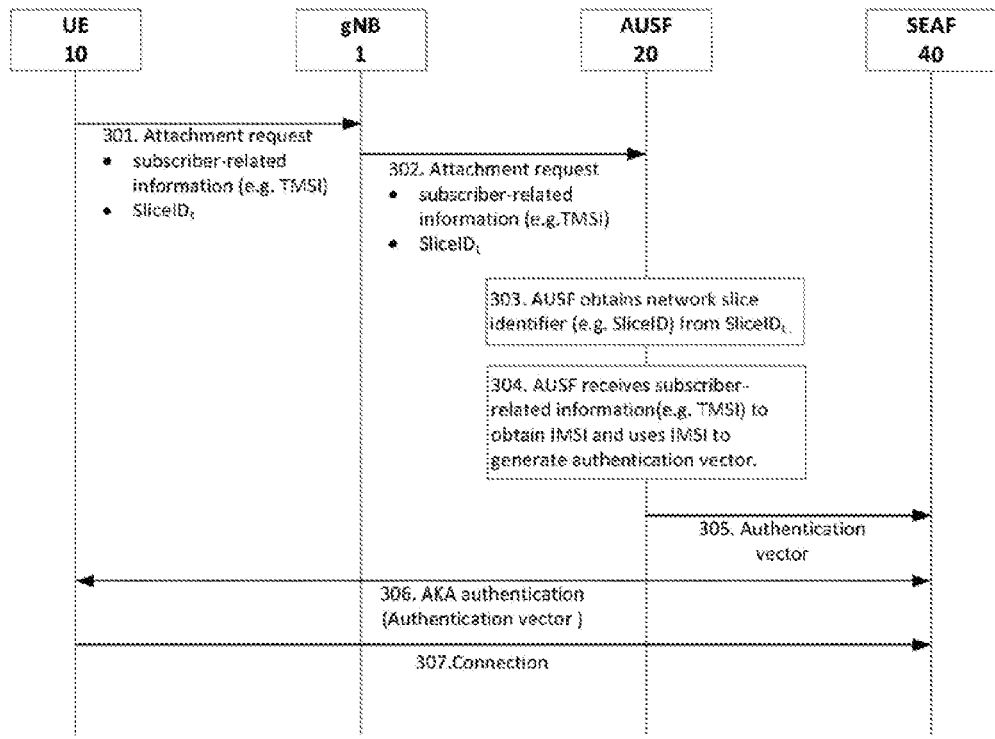
FIG. 3 is a sequence diagram of an example of a computer-implemented method for enabling attachment of user equipment, UE, with a network slice.

FIG. 3 shows a sequence diagram of an example network slice attachment method. As can be seen in FIG. 3, the method comprises sending 301 an attachment request from the UE 10 to the gNB 1. The attachment request comprises the subscriber-related information and the temporary network slice identifier SliceID$_t$, although as will be explained below in some examples the temporary network slice identifier SliceID$_t$ may be optional and the UE 10 may be attached to a default network slice.

The gNB 1 forwards 302 the attachment request on to a network entity, which in this example is the AUSF 20. The AUSF 20 receives the attachment request from the UE 10 comprising the temporary network slice identifier and the subscriber-related information, and performs a lookup operation to obtain the network slice identifier SliceID based on the temporary network slice identifier SliceID$_t$. In the example shown in FIG. 3, the AUSF 20 also obtains 304 the IMSI of the UE 10 based on the subscriber-related information, and in the example shown which is relevant to use in a 5G network, generates an authentication vector based on the IMSI (it will be understood that in the context of other network other forms of data structure may be used to perform authentication). The AUSF 20 sends 305 the authentication vector to a security anchor function, SEAF 40. The SEAF 40 then authenticates 306 the UE 10 by performing authentication and key agreement, AKA, authentication with the UE 10 using the authentication vector, so that the UE 10 can connect 307 with the desired network slice.

Figure 4:
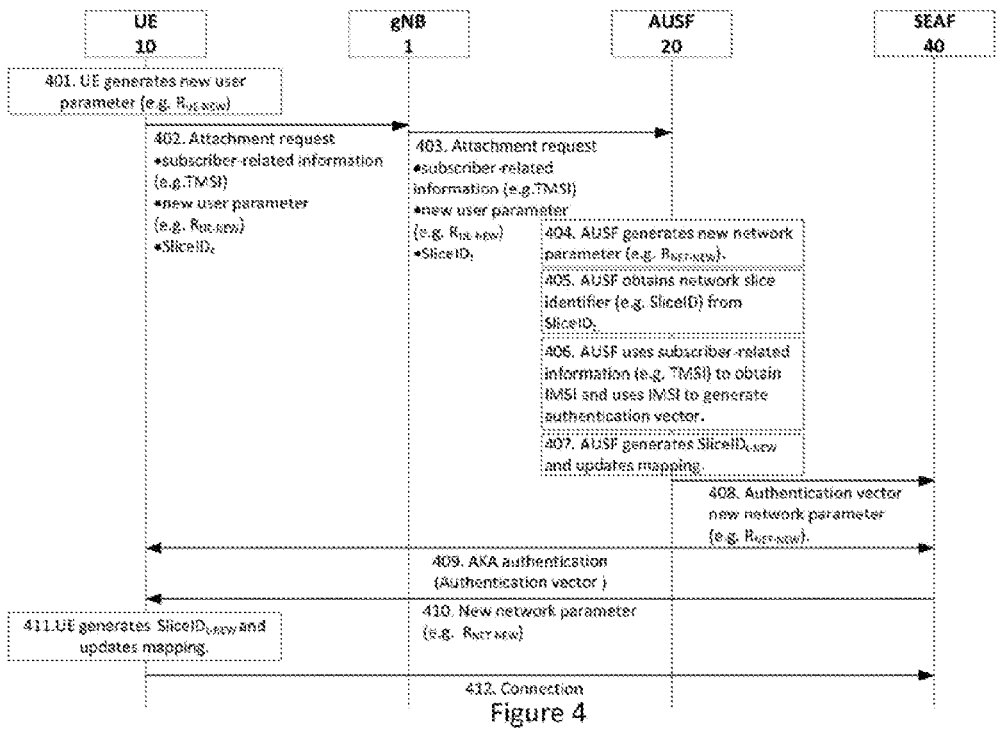
FIG. 4 is a sequence diagram of an example of a computer-implemented method for enabling attachment of user equipment, UE, with a network slice.

FIG. 4 shows a sequence diagram of another example network slice attachment method. The example shown in FIG. 4 may happen when a UE 10 is attempting to re-attach to a temporary network slice identifier SliceID$_t$, for example if the UE 10 has lost connection with the network or if the UE has been disconnected from the network, for example if the UE 10 has been switched off and on again. The UE 10 generates 401 a new user parameter $R_{UE-NEW}$. In some examples the UE 10 may generate the new user parameter $R_{UE-NEW}$ in response to the UE 10 attaching to the network slice, for example so that the new user parameter $R_{UE-NEW}$ is ready for future attachment requests. In some examples the UE 10 may generate the new user parameter $R_{UE-NEW}$ on request, for example at the time of attempting a new attachment initiation.

As shown in FIG. 4, the UE 10 sends 403 a new attachment request comprising the new user parameter $R_{UE-NEW}$, the temporary network slice identifier SliceID$_t$, and subscriber-related information identifying the UE 10 (e.g. TMSI) to a network entity via the gNB 1. The UE 10 may send the new attachment request, for example, in response to the UE losing connection with the network. The network entity (which in the example shown in FIG. 4 is the AUSF 20) receives 403 the new attachment request comprising the new user parameter $R_{UE-NEW}$ and subscriber-related information identifying the UE 10 (e.g. TMSI) from the UE and, in response, generates 404 a new network parameter $R_{NET-NEW}$ (although it will be understood that in other examples the network entity such as the AUSF 20 may receive a new network parameter $R_{NET-NEW}$ from elsewhere such as from another network entity).

The AUSF 20 obtains 405 the SliceID from the temporary network slice identifier SliceID$_t$, for example by performing a look-up, and obtains 406 the IMSI based on the subscriber-related information. The network entity then generates 407 a new temporary network slice identifier, SliceIDtnew based on (a) the new UE parameter $R_{UE-NEW}$, (b) the new network parameter $R_{NET-NEW}$, (c) the subscriber-related information (preferably the subscriber-related information comprises the IMSI), and optionally (d) network slice information such as the network slice identifier SliceID, and maintains a new relationship between the new temporary network slice identifier SliceIDtnew and the network slice information (such as the network slice identifier SliceID), for example by saving a mapping between the network slice identifier SliceID and the new temporary network slice identifier SliceIDtnew, and deletes the old relationship between the old temporary network slice identifier SliceID$_t$ and the network slice identifier SliceID.

In the example shown, the AUSF 20 then generates a new authentication vector based on the IMSI, and sends the new authentication vector and the new network parameter to the SEAF 40. In response, the SEAF 40 performs AKA authentication 409 with the UE 10 using the new authentication vector. Finishing and passing the AKA authentication, the SEAF 40 also sends 410 the new network parameter $R_{NET-NEW}$ to the UE 10.

In response to receiving the new network parameter $R_{NET-NEW}$, the UE 10 generates 411 a new temporary network slice identifier SliceIDtnew, based on (a) the new user parameter $R_{UE-NEW}$, (b) the new network parameter $R_{NET-NEW}$, (c) subscriber-related information (preferably the subscriber-related information comprises the IMSI), and optionally (d) network slice information such as the network slice identifier SliceID, and may maintain a relationship between the network slice identifier SliceID and the SliceIDtnew, for example by saving a mapping between the network slice identifier SliceID and the SliceIDtnew and deleting the old relationship between the old temporary network slice identifier SliceID$_t$ and the network slice identifier SliceID. The UE 10 may then use the new temporary network slice identifier SliceIDtnew to attach 412 the UE 10 to the network slice in the next attachment.

It will be understood, however, that in other examples the UE 10 generates 411 a new temporary network slice identifier SliceIDtnew in response to completing AKA authentication and/or receiving one of the authentication vector and the new network parameter $R_{NET-NEW}$. For example, the UE 10 could receive the new network parameter $R_{NET-NEW}$ first and then later complete AKA authentication, or complete AKA authentication first and then later receive the new network parameter $R_{NET-NEW}$, and only generate the new temporary network slice identifier SliceIDtnew once the UE 10 has both complete AKA authentication and received the new network parameter $R_{NET-NEW}$.

Figure 5:
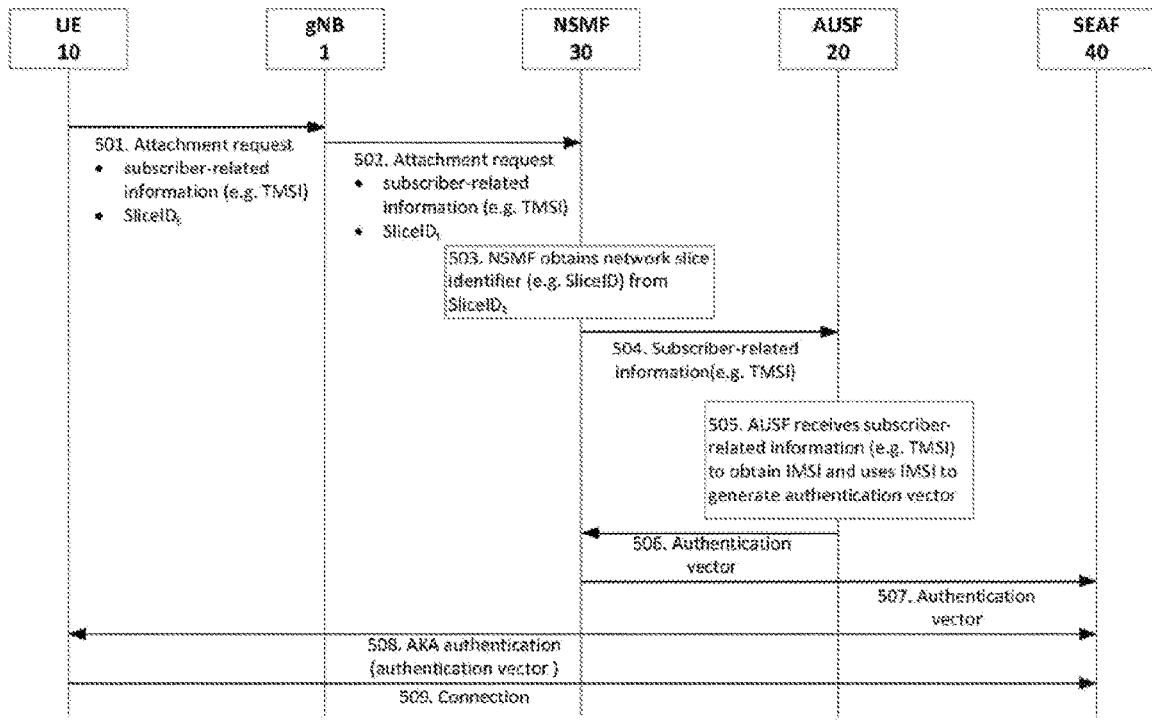
FIG. 5 is a sequence diagram of an example of a computer-implemented method for enabling attachment of user equipment, UE, with a network slice.

FIG. 5 shows a sequence diagram of another example network slice attachment method. As can be seen in FIG. 5, the method comprises sending 501 an attachment request from the UE 10 to the gNB 1. The attachment request comprises the subscriber-related information and optionally the temporary network slice identifier SliceID$_t$, although as will be explained below in some examples the temporary network slice identifier SliceID$_t$ may be optional and the UE may be attached to a default network slice.

The gNB 1 forwards 502 the attachment request on to a network entity, which in this example is the NSMF 30. The NSMF 30 receives the attachment request from the UE 10 via the gNB 1. The attachment request comprises the temporary network slice identifier and the subscriber-related information. The NSMF 30 performs a lookup operation to obtain 503 the SliceID based on the temporary network slice identifier SliceID$_t$.

In the example shown in FIG. 5, the NSMF 30 then forwards 504 the subscriber-related information to the AUSF 20, and the AUSF 20 obtains 505 the IMSI of the UE 10 based on the subscriber-related information, and then generates an authentication vector based on the IMSI. The AUSF 20 sends 506 the authentication vector to the NSMF 30, which then forwards 507 the authentication vector to the SEAF 40. The SEAF 40 then performs 508 AKA authentication with the UE 10 using the authentication vector. In response to passing 508 the AKA authentication with the SEAF 40, the UE 10 connects 509 with the desired network slice.

Figure 6:
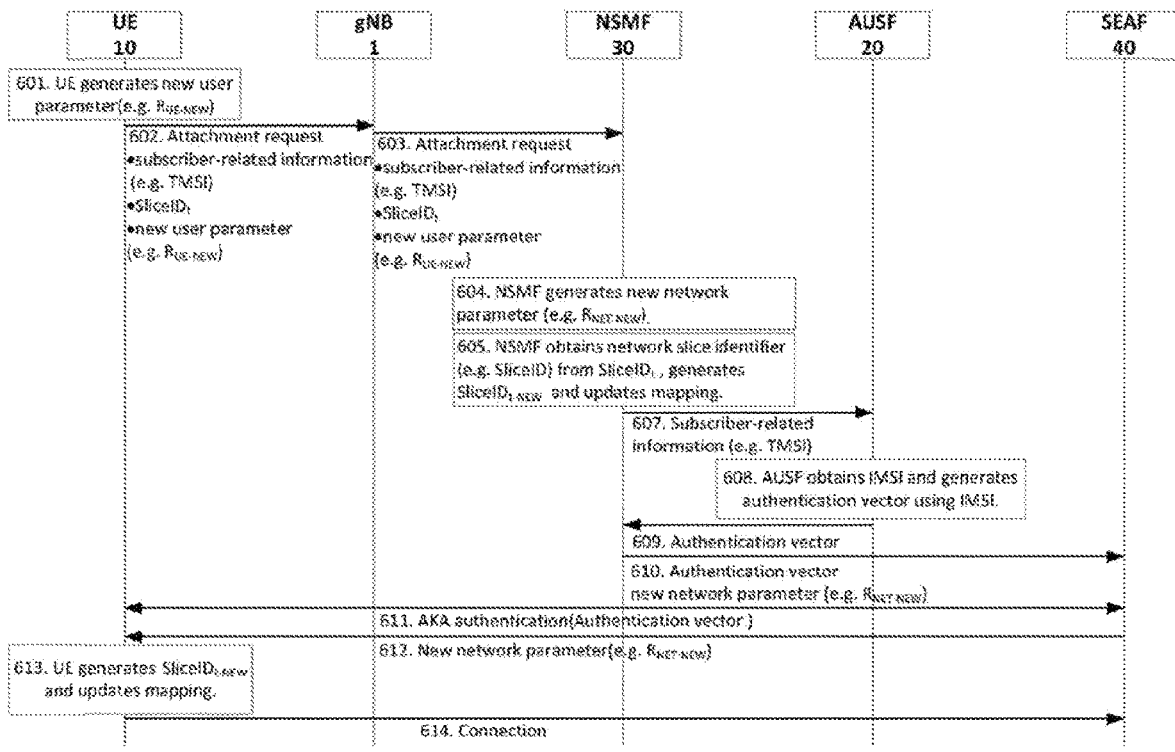
FIG. 6 is a sequence diagram of an example of a computer-implemented method for enabling attachment of user equipment, UE, with a network slice.

FIG. 6 is a sequence diagram of another example network slice attachment method and shares similarities with the method shown in FIGS. 4 and 5. As with the example shown in FIG. 4, the sequence shown in FIG. 6 may happen when a UE 10 is attempting to re-attach to a slice, for example if the UE 10 has lost connection with the network or if the UE 10 has been disconnected from the network, for example if it has been switched off and on again.

As can be seen in FIG. 6, the method comprises generating 601, at the UE 10, a new user parameter $R_{UE}$-NEW. The UE 10 then sends 602 an attachment request from the UE 10 to the gNB 1. The attachment request comprises the new user parameter $R_{UE-NEW}$, subscriber-related information and optionally the temporary network slice identifier $SliceID_t$, although as will be explained below in some examples the temporary network slice identifier $SliceID_t$ may be optional and the UE 10 may be attached to a default network slice.

The gNB 1 forwards 603 the attachment request on to a network entity, which in this example is the NSMF 30. The NSMF 30 receives the attachment request from the UE comprising the temporary network slice identifier and the subscriber-related information, and in response generates 604 a new network parameter $R_{NET-NEW}$. The NSMF 30 then obtains 605 the SliceID based on the temporary network slice identifier $SliceID_t$ (for example by performing a lookup operation). The NSMF 30 then generates a new temporary network slice identifier, SliceIDtnew based on (a) the new UE parameter $R_{UE-NEW}$, (b) the new network parameter $R_{NET-NEW}$, (c) the subscriber-related information (preferably the subscriber-related information comprises the IMSI), and optionally (d) network slice information such as the network slice identifier SliceID, and maintains a new relationship between the new temporary network slice identifier SliceIDtnew and the network slice information such as the SliceID, for example by saving a mapping between the network slice identifier SliceID and the SliceIDtnew, and deletes the old relationship between the old temporary network slice identifier $SliceID_t$ and the network slice identifier SliceID.

In the example shown in FIG. 6 the NSMF 30 then forwards 607 the subscriber-related information to the AUSF 20, and the AUSF 20 obtains 608 the IMSI of the UE 10 based on the subscriber-related information, and generates an authentication vector based on the IMSI. The AUSF 20 sends 609 the authentication vector to the NSMF 30, which then sends 610 the authentication vector and the new network parameter $R_{NET-NEW}$ to the SEAF 40. The SEAF 40 then performs 611 the AKA authentication with the UE 10. The SEAF 40 also sends 612 the new network parameter $R_{NET-NEW}$ to the UE 10. In response to receiving the new network parameter $R_{NET-NEW}$ from the SEAF 40, the UE 10 generates a new temporary network slice identifier SliceIDtnew based on (a) the new UE parameter $R_{UE-NEW}$, (b) the new network parameter $R_{NET-NEW}$, (c) the subscriber-related information (preferably the subscriber-related information comprises the IMSI) and optionally (d) network slice information such as the network slice identifier SliceID, and maintains a new relationship between the new temporary network slice identifier SliceIDtnew and the network slice information such as the SliceID, for example by saving a mapping between the network slice identifier SliceID and the SliceIDtnew, and deletes the old relationship between the old temporary network slice identifier $SliceID_t$ and the network slice identifier SliceID. The UE 10 then connects 614 with the desired network slice.

In some examples the UE 10 may not specify network slice information such as a network slice identifier SliceID. For example, the UE 10 may be attaching to the network in an emergency. Additionally or alternatively, some devices may be allocated to a lower tier of network access, for example connected or "smart" devices, such as a smart meter or the like, may be allocated a default tier of network access. This may be because such devices do not need a high bandwidth connection to the network. In such cases the UE 10 may be allocated a default slice. In such examples the temporary network slice identifier $SliceID_t$ provided by the network entity may have a relationship with, for example be mapped to, the default slice, and using the temporary network slice identifier $SliceID_t$ to attach the UE 10 to the network slice comprises attaching the UE 10 to the default network slice.

It should also be understood that in many examples the temporary network slice identifier $SliceID_t$ uniquely corresponds to network slice information such as the network slice identifier SliceID. Therefore if a UE wishes to connect to multiple network slices it may make use of a plurality of different temporary network slice identifiers $SliceID_t$.

Figure 7A:
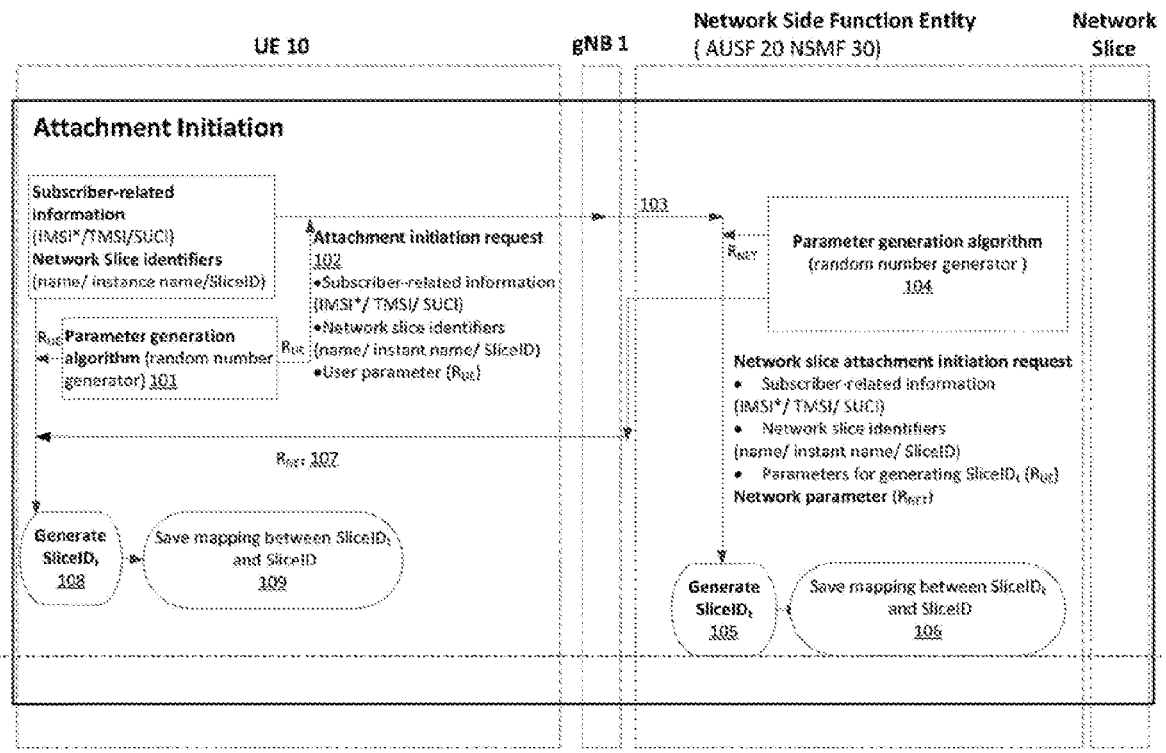
FIG. 7A is a schematic diagram of an example attachment initiation method between UE, gNB, network side function entity and network slice.
Figure 7B:
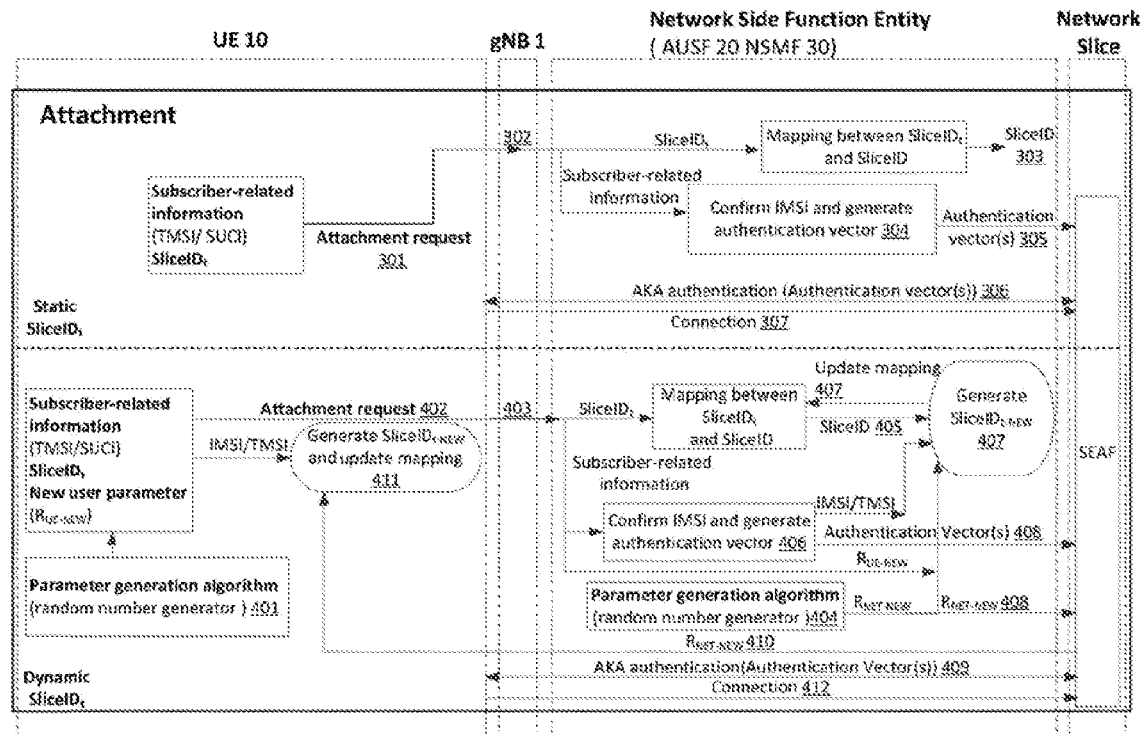
FIG. 7B is a schematic diagram of an example attachment method between UE, gNB, network function entity and network slice.

The methods described above with respect to FIGS. 1 to 6 can be summarised in FIGS. 7A and 7B, which are a schematic diagrams of an example attachment initiation, attachment and connection method between UE 10, gNB 1, network function entities (such as the NSMF 30, AUSF 20 and SEAF 40) and network slice. The example shown in FIGS. 7A and 7B are a combination of the examples shown in FIGS. 1, 3 and 4.

The methods described above may provide a privacy protection method, device and system for network slice identity information, in order to solve the problem of privacy protection of a network slice identifier in a communication system, such as a 5G communication system, when the UE 10 accesses a network slice.

In order to address this technical problem, the method may provide a privacy protection method for network slice identity information. The network slice identity information may be a network slice identity or a network slice identifier.

A subscriber data management entity of a network, such as the AUSF 20, is configured with a parameter generation algorithm for generating the parameters required for temporary network slice identity information such as temporary network slice identifier, $SliceID_t$, and an algorithm for generating the temporary network slice identifier $SliceID_t$. The parameter generation algorithm for generating the parameters used for generating the temporary network slice identifier $SliceID_t$ may be a random number generator for generating a network parameter $R_{NET}$ that is a random number, wherein the random number may be used, together with a user parameter $R_{UE}$ that may also be a random number generated by a random number generator configured at the UE (for example the same random number generator as used by the network entity), as input parameters of the algorithm for generating the temporary network slice identifier, $SliceID_t$.

The algorithm for generating the temporary network slice identifier $SliceID_t$ may be used to generate the temporary network slice identifier $SliceID_t$ based on (a) subscriber-related information, such as an IMSI, (d) optionally the network slice information such as the slice identifier SliceID, and parameters which are representative of the freshness, such as (b) the network parameter $R_{NET}$ and (a) the user parameter $R_{UE}$. $SliceID_t$ represents a temporary network slice identifier for the UE accessing a network slice.

At a network side, the subscriber data management entity of the network, such as the AUSF 20, may manage and maintain subscriber data. The AUSF 20 may also be a network entity for managing UE 10 access authentication. The AUSF 20 may generate the temporary network slice identifier $SliceID_t$, and the AUSF 20 may also save, manage, and maintain a corresponding relationship between the network slice identifier SliceID and the temporary network slice identifier $SliceID_t$.

In addition, at the network side, another network entity such as the NSMF 30 may generate the temporary network slice identifier $SliceID_t$, and may also be used to save, manage, and maintain the corresponding relationship between the network slice information such as the network slice identifier SliceID, and the temporary network slice identifier SliceID$_t$.

At the network side, only one network side function entity may be used to generate the temporary network slice identifier, SliceID$_t$, and to save, manage, and maintain the corresponding relationship between the network slice information such as the network slice identifier SliceID and the temporary network slice identifier SliceID$_t$.

At the network side, the network slice may include a security management function entity, such as the SEAF 40, being a security anchor in the network slice. The network slice may also include an access and mobility management function, AMF, for mobility management of the UE 10.

At the UE 10 side, the UE 10 may maintain and manage the subscriber data. The UE 10 may generate the temporary network slice identifier SliceID$_t$. The UE 10 may save, manage, and maintain the temporary network slice identifier SliceID$_t$. The UE 10 may be used to save, manage, and maintain the corresponding relationship between the network slice information such as the network slice identifier SliceID and the temporary network slice identifier SliceID$_t$. A single UE 10 may access a plurality of different network slices, in which case, the UE 10 may save, manage and maintain a plurality of pieces of different temporary network slice identifier SliceID$_t$; and the UE 10 may also save, manage, and maintain corresponding relationships between the plurality of pieces of network slice identifier SliceID and the corresponding temporary network slice identifier SliceID$_t$.

In the examples described here, the UE 10 accesses the network slice using the temporary network slice identity SliceID$_t$. In addition, before the UE 10 first accesses the network slice, the temporary network slice identifier SliceID$_t$ of the UE 10 may be generated on the UE 10 and the network slice management function entity, such as the AUSF 20, at the network side in the process of the attachment initiation of the UE 10 with the network slice.

The specific process of the attachment initiation of the UE 10 with a network slice may comprise the UE 10 firstly generating a user parameter R$_{UE}$ by means of a configured parameter generation algorithm. In some examples the parameter generation algorithm is a random number generator, and the UE 10 generates a user parameter R$_{UE}$ by means of the random number generator. The UE 10 sends a network slice attachment initiation request information to a 5G base station gNB 1, wherein the network slice attachment initiation request information comprises subscriber-related information relevant to the UE 10, a parameter for generating the temporary network slice identifier, such as the user parameter R$_{UE}$, and network slice information, such as a network slice name, or a network slice instance name, or a network slice identity, etc., where the subscriber identity-related information may be an IMSI, and may also be a TMSI, and may also be a SUCI, and the network slice information may be a network slice name, a network slice instance name, or a network slice identity, and may be obtained by the UE 10 prior to attachment initiation.

After receiving the network slice attachment initiation request information sent by the UE 10, the gNB 1 further sends the attachment initiation request information to a function entity that processes the network slice attachment initiation request information at the network side, wherein the function entity that processes the network slice attachment initiation request information at the network side may be a subscriber data management entity of a home network, such as the AUSF 20, and may also be the NSMF 30. In some examples the AUSF 20 may serve as the function entity that processes the network slice attachment initiation request information at the network side whereas in other examples the NSMF 30 may serve as the function entity that processes the network slice attachment initiation request information at the network side.

After receiving the network slice attachment initiation request information, the function entity that processes the network slice attachment initiation request information at the network side may optionally first generates a network parameter R$_{NET}$ by means of a configured parameter generation algorithm. In some examples the parameter generation algorithm is a random number generator, and the network entity generates a network parameter R$_{NET}$ by means of the random number generator. According to network slice information in the attachment initiation information, the subscriber identifier, such as the IMSI or the TMSI, and the user parameter R$_{UE}$ and the network parameter R$_{NET}$, and optionally network slice information such as the SliceID, the function entity generates a temporary network slice identity SliceID$_t$ for the UE 10, wherein the temporary network slice identity SliceID$_t$ generated for the UE uniquely corresponds to a network slice identity SliceID registered by the UE 10. The network entity that processes the network slice attachment initiation request information at the network side saves a corresponding relationship between the network slice information such as the network slice identifier SliceID and the temporary network slice identifier SliceID$_t$.

The function entity that processes the network slice attachment initiation request information at the network side further sends attachment initiation confirmation information to the UE 10, wherein the attachment initiation confirmation information includes the network parameter R$_{NET}$, and when the parameter generation algorithm is a random number generator, the network parameter R$_{NET}$ is a random number.

After receiving the attachment initiation confirmation information, according to the received network parameter, and the user parameter R$_{UE}$ on the UE 10, such as a random number, and the network parameter R$_{NET}$, which may also be a random number, as well as optionally the network slice information such as the SliceID, and the subscriber identifier, such as the IMSI or the TMSI, the UE 10 generates a temporary network slice identifier SliceID$_t$ for the UE 10, wherein the temporary network slice identifier SliceID$_t$ generated by the UE 10 uniquely corresponds to a network slice identifier SliceID registered by the UE 10. The UE 10 may save a corresponding relationship between the network slice identifier SliceID and the temporary network slice identifier SliceID$_t$.

In the examples described here, the UE 10 and the function entity that processes the network slice attachment initiation request information at the network side are configured with the same algorithm for generating temporary network slice identifier SliceID$_t$; therefore, when the same input information is used, the temporary network slice identity information which is respectively generated on the UE 10 and the function entity that processes the network slice attachment initiation request information at the network side is the same.

After the UE 10 completes attachment initiation with a network slice, for the UE 10 to attach to a network and access a network slice, the UE sends attachment request information to the 5G base station gNB 1, wherein the attachment request information may comprise subscriber-related information and the temporary network slice identifier SliceID$_t$, wherein the mobile subscriber identity-related information may be a temporary subscriber identifier, such as a TMSI, and may also be a SUCI.

After receiving the attachment request information sent by the UE 10, the gNB 1 further sends the attachment request information to the AUSF 20. After receiving the attachment request information, the AUSF 20 determines the IMSI based on the subscriber—related information, and generates a corresponding authentication vector based on the IMSI. The AUSF 20 then searches for a corresponding network slice identifier SliceID based on the SliceID$_t$; and sends authentication vector information to an SEAF 40 of a network slice corresponding to the network slice identifier SliceID.

After receiving the authentication vector information, the SEAF 40 performs AKA authentication with the UE 10 using the authentication vector. After the authentication succeeds, the UE 10 accesses the network slice.

In some examples, after the UE completes attachment initiation with a network slice, when the UE 10 attaches to a network and accesses a network slice, the UE 10 may generate a new user parameter $R_{UE\text{-}NEW}$ by means of a configured parameter generation algorithm. In some examples the parameter generation algorithm is a random number generator, and the UE 10 generates a new user parameter $R_{UE\text{-}NEW}$ by means of the random number generator. The UE 10 sends attachment request information to a 5G base station gNB 1, wherein the attachment request information comprises subscriber-related information, a SliceID$_t$, and the new user parameter, such as the new user parameter $R_{UE\text{-}NEW}$, and where the subscriber-related information may be a TMSI, and may also be SUCI.

After receiving the attachment request information sent by the UE 10, the gNB 1 further sends the attachment request information to the AUSF 20.

After receiving the attachment request information, the AUSF 20 may generate a new network parameter $R_{NET\text{-}NEW}$ by means of a configured parameter generation algorithm. In some examples the parameter generation algorithm is a random number generator, and the AUSF 20 generates a new network parameter $R_{NET\text{-}NEW}$ by means of the random number generator. The AUSF 20 searches for a corresponding network slice identifier SliceID based on the SliceID$_t$. The AUSF 20 obtains an IMSI based on the subscriber-related information in the attachment request information; and at the same time, based on the SliceID, and the IMSI or the subscriber-related information in the attachment request information, such as the TMSI, and the new user parameter $R_{UE\text{-}NEW}$ and the new network parameter $R_{NET\text{-}NEW}$, and optionally network slice information such as the SliceID, generates a new temporary network slice identifier SliceID$_{t\text{-}NEW}$ for the UE 10, and deletes the old temporary network slice identifier SliceID$_t$ from a corresponding relationship between the network slice identifier SliceID and the old temporary network slice identifier SliceID$_t$, and saves a corresponding relationship between the network slice identifier SliceID and the new temporary network slice identifier SliceID$_t$-NEW.

At the same time, after receiving the attachment request information, the AUSF 20 determines the IMSI based on the subscriber identity-related information, and generates a corresponding authentication vector based on the IMSI; and then sends authentication vector information and the new network parameter, such as the new network parameter $R_{NET\text{-}NEW}$, to an SEAF 40 supporting a network slice corresponding to the network slice identifier SliceID.

After receiving the authentication vector information, the SEAF 40 performs AKA authentication with the UE 10 using the authentication vector. After the authentication succeeds, the SEAF 40 further sends the new network parameter $R_{NET\text{-}NEW}$, to the UE.

After receiving the new network parameter $R_{NET\text{-}NEW}$, with the new user parameter $R_{UE\text{-}NEW}$ on the UE 10, as well as the subscriber-related information, such as the IMSI or the TMSI, and optionally network slice information such as the slice identifier SliceID, the UE 10 generates a new temporary network slice identity SliceID$_{t\text{-}NEW}$ for the UE 10, and deletes the temporary network slice identifier SliceID$_t$ from the corresponding relationship between the network slice identifier SliceID and the old temporary network slice identifier SliceID$_t$, and saves a corresponding relationship between the network slice identifier SliceID and the new temporary network slice identifier SliceID$_t$-NEW; meanwhile, the UE 10 accesses the network slice.

In embodiments of the disclosure, after an authentication vector is used, and if authentication needs to be performed again between the UE 10 and the network slice, an authentication vector that has not been used can be used for re-authentication between the UE 10 and the network slice. In other words, AKA authentication may be performed again. For example, the network entity such as the AUSF 20 may generate a group comprising a plurality of authentication vectors based on the subscriber-related information, such as the IMSI, and a different authentication vector selected from this group may be used for re-authentication.

When AKA re-authentication is performed, the AUSF 20 does not need to generate an authentication vector again; instead the SEAF 40 can select an unused authentication vector from the group of authentication vectors to complete the AKA authentication between the UE 10 and the network slice. Either the UE 10 or the network entity, such as the SEAF 40, can initiate the AKA re-authentication process.

Additionally or alternatively, in embodiments of the disclosure, if AKA authentication is not successful, AKA authentication (for example, as described above with respect to FIGS. 3 to 6) may be attempted, and/or the attachment initiation process (for example, as described above with respect to FIGS. 1 and 2) may be attempted.

Figure 8:
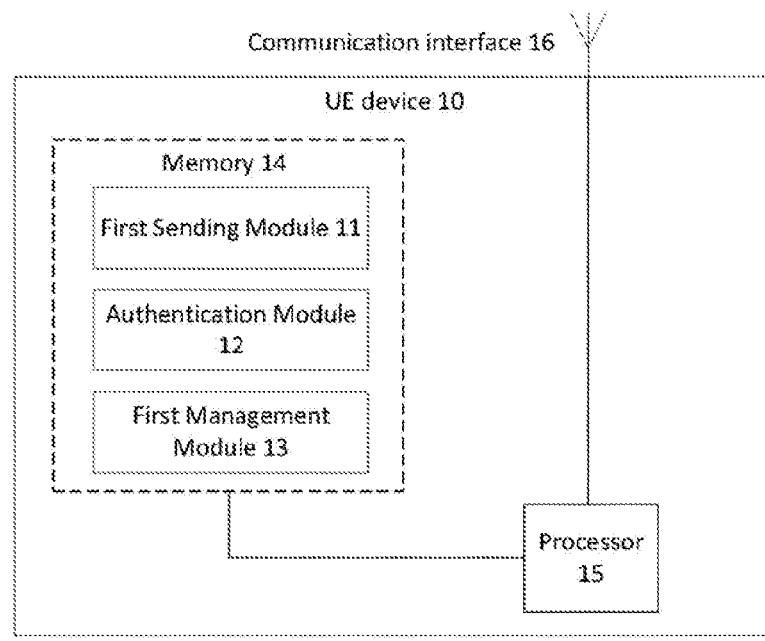
FIG. 8 is a functional block diagram of an example UE for use with the method of any of FIGS. 1 to 7.

FIG. 8 is a functional block diagram of an example UE for use with the method of any of FIGS. 1 to 7. As shown in FIG. 8, a UE device 10 comprises a memory 14 comprising a first sending module 11, a first authentication module 12, and a first management module 13. The memory 14 is coupled to a processor 15 which is coupled to a communication interface 16. The processor 15 is configured to control operation of the UE 10 by loading the modules, and the processor 15 is configured to operate the communication interface 16, for example, to communicate with a gNB 1, so that the UE 10 can perform aspects of the method described above with reference to any of FIGS. 1 to 7, The first sending module 11, when loaded by processor 15, is configured to control the UE 10 to send network slice attachment initiation request information, attachment request information, a user parameter $R_{UE}$, and network slice access request information to a network, wherein the network slice attachment initiation access request information may comprise subscriber-related information about the UE, a user parameter $R_{UE}$, such as the UE random number mentioned above, and network slice information, such as a network slice name, or a network slice instance name, or a network slice identifier, etc. As noted above, the subscriber-related information may be a TMSI, and may also SUCI. Also as noted above, the attachment request information may comprise the subscriber-related information and the temporary network slice identifier SliceID$_t$, wherein the subscriber-related information may be a temporary subscriber identifier, such as a TMSI, and may also be a SUCI.

The authentication module 12, when loaded by processor 15, is configured to authenticate the UE with the network slice.

The first management module 13 may comprise an algorithm for generating a user parameter, such as a random number generation algorithm, in order to generate the user parameter. The first management module 13 may also comprise an algorithm for generating a temporary network slice identifier. The first management module 13, when loaded by processor 15, may also be configured to control the UE 10 to save, update, and maintain the temporary network slice identifier SliceID$_t$. A single UE 10 may access a plurality of different network slices, in which case, the UE 10 may save, manage and maintain a plurality of different temporary network slice identifiers SliceID$_t$.

Figure 9:
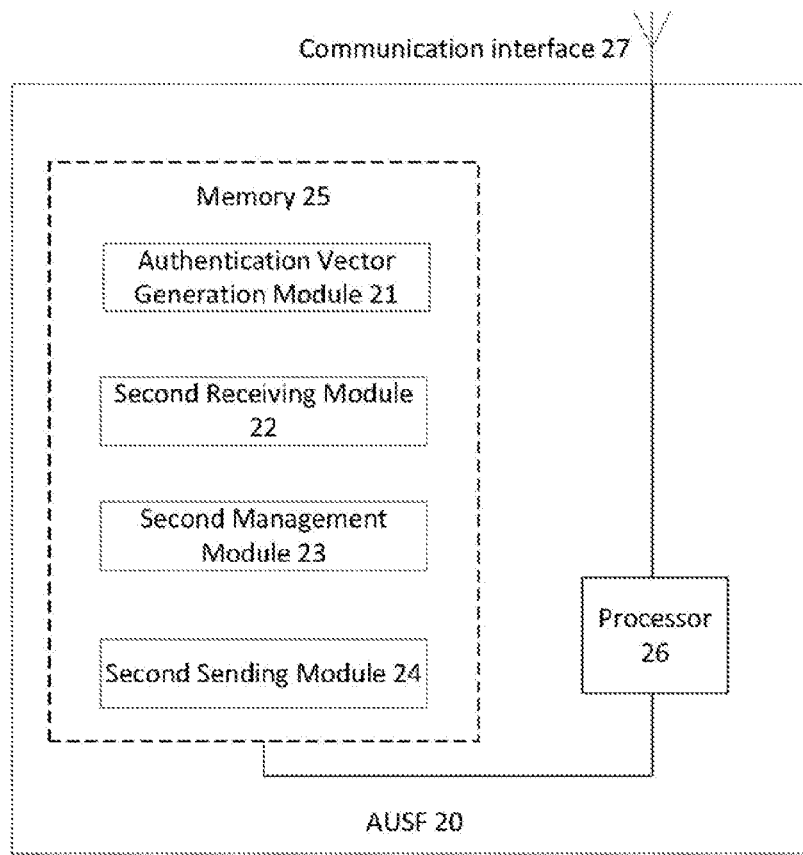
FIG. 9 is a functional block diagram of an example network authentication server function entity for use with the method of any of FIGS. 1 to 7.

FIG. 9 is a functional block diagram of an example AUSF for use with the method of any of FIGS. 1 to 7. As shown in FIG. 9, the AUSF 20 comprises a memory 25 comprising an authentication vector generation module 21, a second receiving module 22, a second management module 23 and a second sending module 24. The memory 25 is coupled to a processor 26 which is coupled to a communication interface 27. The processor 26 is configured to control operation of the AUSF 20 by loading the modules from the memory 25, and the processor 26 is configured to operate the communication interface 27, for example, to communicate with a UE 10 via a gNB 1, so that the AUSF 20 can perform aspects of the method described above with reference to any of FIGS. 1 to 7.

The second receiving module 22, when loaded by processor 26, is configured to control the AUSF 20 to receive network slice attachment initiation request information, attachment request information, and network slice access request information sent by a gNB 1 and originating from the UE. The second receiving module 22, when loaded by processor 26, is also configured to receive authentication request information sent by an SEAF, and receive authentication request information sent from a NSMF.

The second management module 23 may comprise an algorithm for generating the network side parameter R$_{NET}$. The second management module 23 may also comprise an algorithm for generating a temporary network slice identifier. The second management module 23, when loaded by processor 26, is also configured to save, update, and maintain a corresponding relationship between a network slice identifier SliceID and the temporary network slice identifier SliceID$_t$.

The second sending module 24 is configured to control the AUSF 20 to send the network parameter R$_{NET}$, authentication information and network slice access request information.

Figure 10:
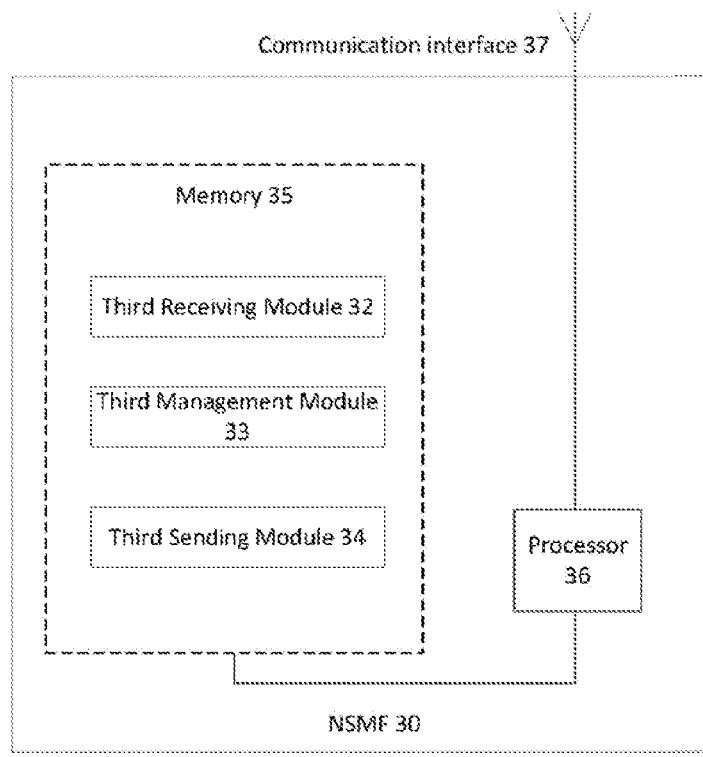
FIG. 10 is a functional block diagram of an example network slice management function entity for use with the method of any of FIGS. 1 to 7.

FIG. 10 is a functional block diagram of an example NSMF 30 for use with the method of any of FIGS. 1 to 7. As shown in FIG. 10, the network authentication server function entity (NSMF) 30 comprises a memory 35 comprising a third receiving module 22, a third management module 33 and a third sending module 34. The memory 35 is coupled to a processor 36 which is coupled to a communication interface 37. The processor 36 is configured to control operation of the NSMF 30 by loading the modules from the memory 35, and the processor 36 is configured to operate the communication interface 37, for example, to communicate with a UE via a gNB, so that the NSMF can perform aspects of the method described above with reference to any of FIGS. 1 to 7.

The third receiving module 32, when loaded by processor 36, is configured to control the NSMF 30 to receive network slice attachment initiation request information, attachment request information, and network slice access request information sent by a gNB and originating from the UE. The third receiving module 32, when loaded by processor 36, is also configured to control the NSMF 30 to receive authentication vector information sent by an AUSF.

The second management module 33 may comprise an algorithm for generating a user parameter, such as a random number generation algorithm, for example to generate the network side parameter R$_{NET}$. The second management module 33 may also comprise an algorithm configured to generate a temporary network slice identifier. The second management module 33 may also be configured to control the NSMF 30 to save, update, and maintain a corresponding relationship between a network slice identifier SliceID and the temporary network slice identifier SliceID$_t$; and The second sending module 34, when loaded by processor 36, may be configured to control the NSMF 30 to send information such as an IMSI, network parameter R$_{NET}$ information, a temporary network slice identifier, authentication information, and the network slice access request information.

Figure 11:
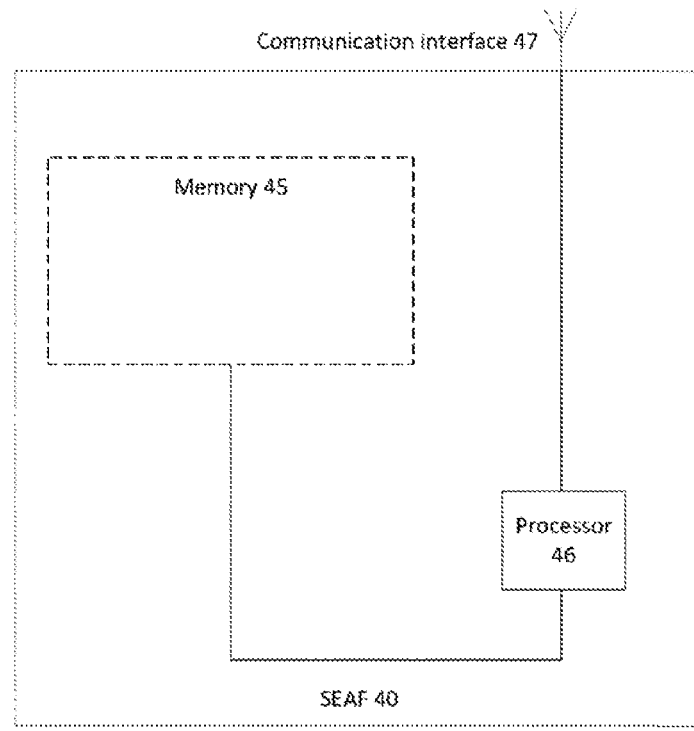
FIG. 11 is a functional block diagram of an example security management function entity for use with the method of any of FIGS. 1 to 7.

FIG. 11 is a functional block diagram of an example SEAF 40 for use with the method of any of FIGS. 1 to 7. As shown in FIG. 11, the security anchor function entity (SEAF) 40 comprises a memory 45. The memory 45 is coupled to a processor 46 which is coupled to a communication interface 47. The processor 46 is configured to control operation of the SEAF 40 by loading the memory 45, and the processor 46 is configured to operate the communication interface 47, for example, to communicate with a UE via a gNB, so that the SEAF can perform aspects of the method described above with reference to any of FIGS. 1 to 7.

Figure 12:
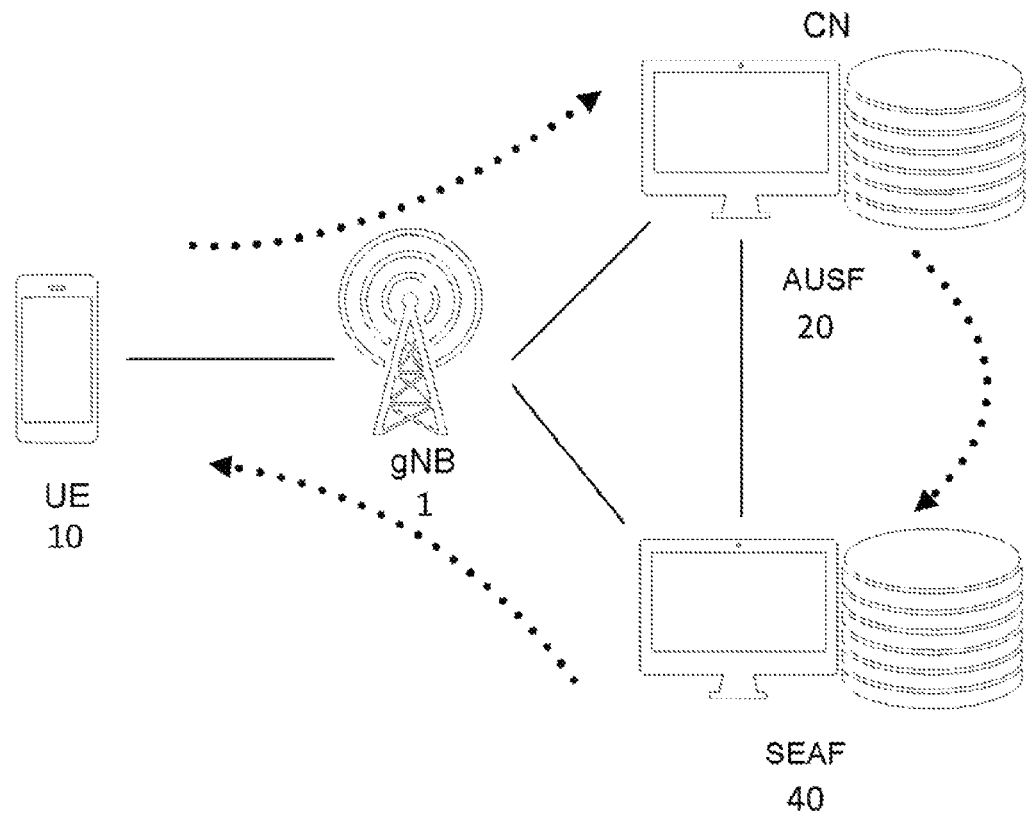
FIG. 12 is a functional block diagram of an example network slice access system for use with the method of any of FIGS. 1 to 7.

FIG. 12 is a functional block diagram of an example network slice access system for use with the method of any of FIGS. 1 to 7. As shown in FIG. 12, the network slice access system comprises a UE device 10 (such as the example device shown in FIG. 8), a gNB provided as part of a radio access network (RAN) of a 5G network, and an AUSF (such as the example AUSF 20 described above with reference to FIG. 9) and a SEAF (such as the example SEAF 40 described above with reference to FIG. 11). The UE 10 is configured to communicate with the AUSF 20 and the SEAF 40 via the gNB 1. The AUSF 20 and SEAF 40 are configured to communicate with each other and with the UE 10 via the gNB 1.

The access system shown in FIG. 12 may be configured to attach user equipment, UE 10, with a network slice supported by the AUSF 20 and SEAF 40.

To do this, the system may be configured to send a user parameter R$_{UE}$, and subscriber-related information identifying the UE 10, from the UE 10 to at least one of the one or more network entities, such as the AUSF 20 and/or SEAF 40. The system is also configured to optionally generate a network parameter, and send the network parameter from at least one of the one or more network entities to the UE 10. For example at least one of the AUSF 20 and the SEAF 40 may be configured to generate the network parameter R$_{NET}$ and the same network entity or the other network entity may be configured to send it to the UE 10.

The system may also be configured to generate a temporary network slice identifier at both the UE 10 and at least one of the one or more network entities, for example at the AUSF 20 and/or the SEAF 40.

The system may be configured to generate the temporary network slice identifier based on (a) the user parameter $R_{UE}$, (b) the network parameter $R_{NET}$, (c) subscriber-related information and (d) optionally network slice information such as a network slice identifier SliceID sent by the UE 10. The temporary network slice identifier $SliceID_t$ generated at the UE 10 may have a mathematical relationship with, for example a one-to-one mapping with, the temporary network slice identifier generated at the at least one network entity such as the AUSF 20 or SEAF 40.

The system is also configured to use the temporary network slice identifier $SliceID_t$ to attach the UE 10 to a network slice associated with the network slice identifier.

The system may be configure to generate the user parameter $R_{UE}$ at the UE using a parameter generation algorithm, and generate the network parameter $R_{NET}$ at the at least one network entity using the same or another parameter generation algorithm.

Figure 13:
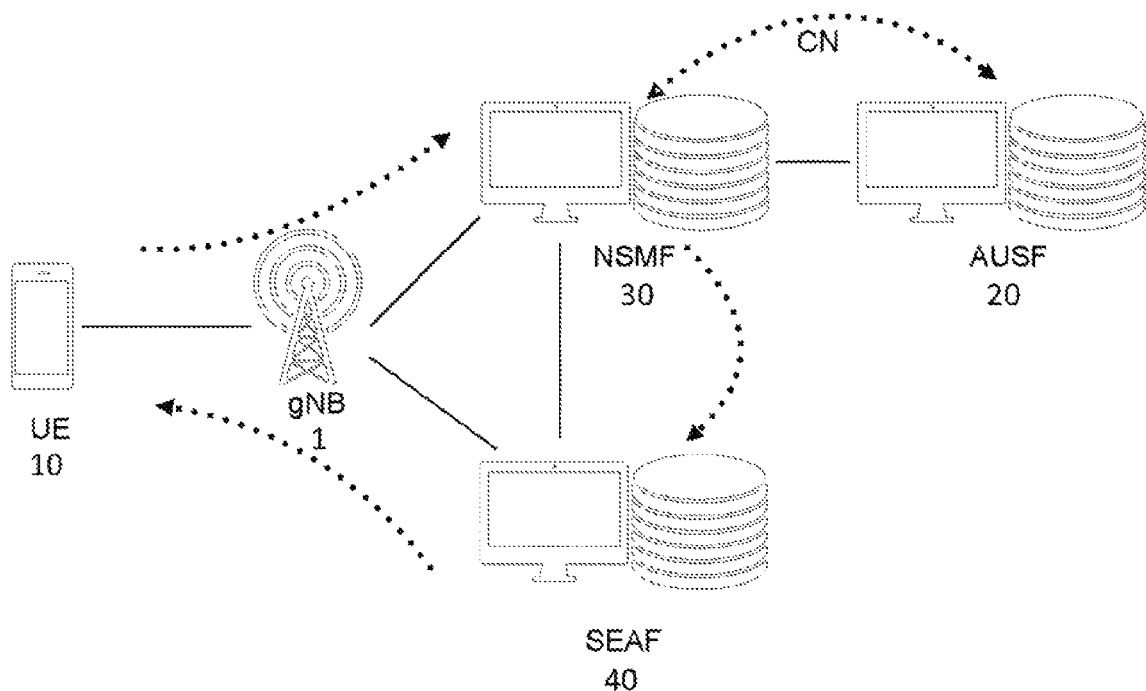
FIG. 13 is a functional block diagram of another example network slice access system for use with the method of any of FIGS. 1 to 7.

FIG. 13 is a structural schematic diagram of another example network slice access system for use with the method of any of FIGS. 1 to 7. As shown in FIG. 12, the network slice access system comprises a UE device 10 (such as the example device shown in FIG. 8), a gNB 1 provided as part of a radio access network (RAN) of a 5G network, an NSMF (such as the example NSMF 30 described above with reference to FIG. 10, an AUSF (such as the example AUSF 20 described above with reference to FIG. 9) and a SEAF (such as the example SEAF 40 described above with reference to FIG. 11). The NSMF 30 and SEAF 40 may be provided as part of the same physical entity, and the AUSF may be provided as part of a separate physical entity. It will be understood that in the context of a network architecture such as a 5G network architecture making use of network function virtualization, the network entities such as the NSMF 30, AUSF 20 and SEAF 40 may be provided on the same physical entity (such as a server) or on different physical entities.

The UE 10 is configured to communicate with the NSMF 30 and the SEAF 40 via the gNB 1, and also indirectly with the AUSF 20 via the NSMF 30. The AUSF 20 and NSMF 30 are configured to communicate with each other and with the UE 10 via the gNB 1, and the AUSF 20 and NSMF 30 are also configured to communicate with each other.

The access system shown in FIG. 13 may be configured to attach user equipment, UE 10, with a network slice supported by the AUSF 20, SEAF 40 and NSMF 30 as described above. For example, to do this, the system may be configured to send a user parameter $R_{UE}$, and subscriber-related information identifying the UE, from the UE 10 to at least one of the one or more network entities, such as the NSMF 30, AUSF 20 and/or SEAF 40. The system is also configured to optionally generate a network parameter $R_{NET}$, and send the network parameter from at least one of the one or more network entities to the UE 10. For example at least one of the NSMF 30, AUSF 20 and the SEAF 40 may be configured to generate the network parameter $R_{NET}$ and the same network entity or the other network entity may be configured to send it to the UE 10.

The system may also be configured to generate a temporary network slice identifier $SliceID_t$ at both the UE 10 and at least one of the one or more network entities, for example at the NSMF 30, AUSF 20 and/or the SEAF 40.

The system may be configured to generate the temporary network slice identifier based on (a) the user parameter $R_{UE}$, (b) the network parameter $R_{NET}$, (c) subscriber-related information and (d) optionally network slice information such as a network slice identifier SliceID sent by the UE 10. The temporary network slice identifier $SliceID_t$ generated at the UE 10 may have a mathematical relationship with, for example a one-to-one mapping with, the temporary network slice identifier generated at the at least one network entity such as the NSMF 30, AUSF 20 or SEAF 40.

The system is also configured to use the temporary network slice identifier $SliceID_t$ to attach the UE 10 to a network slice associated with the network slice identifier SliceID.

The system may be configured to generate the user parameter $R_{UE}$ at the UE using a parameter generation algorithm, and generate the network parameter $R_{NET}$ at the at least one network entity using another or the same parameter generation algorithm.

It will be understood that the examples contained within this disclosure are described in the context of network entities supporting a 5G network, although it will be understood that aspects of the disclosure may also be applicable to other networks, for example other networks that make use of network function virtualization, NFV. As such, the network entities may be physical or virtual network entities, and it will be understood that any one or more of the network entities may be provided on the same physical entity (such as a server) or on separate physical entities. It will also be understood that the network entities may be implemented as software, firmware and/or hardware, or any combination thereof, and may be implemented on a single physical entity or distributed across a plurality of different physical entities.

It will be understood that in the context of the present disclosure, the term mapping may be used in the mathematical sense of the word defining the association between the slice identifier SliceID and the temporary network slice identifier $SliceID_t$, and may define a one-to-one relationship between the slice identifier SliceID and the temporary network slice identifier $SliceID_t$.

In some examples there may be a mathematical relationship between the $SliceID_t$ generated by the UE 10 and the NSMF 30—for example the temporary network slice identifier $SliceID_t$ generated by the UE 10 may be a multiple of the temporary network slice identifier $SliceID_t$ generated by the NSMF 30. In such examples the relationship between the temporary network slice identifier $SliceID_t$ generated by the UE 10 and the NSMF 30 may be stored, for example at the UE 10 and/or the NSMF 30. However, it will also be understood that the relationship between the temporary network slice identifier $SliceID_t$ generated by the UE 10 and the NSMF 30 may be stored elsewhere and received or retrieved by the UE 10 and/or the NSMF 30.

It will be appreciated from the discussion above that the embodiments shown in the Figures are merely exemplary, and include features which may be generalised, removed or replaced as described herein and as set out in the claims. In the context of the present disclosure other examples and variations of the apparatus and methods described herein will be apparent to a person of skill in the art.

What is claimed is:

1. A method for attaching user equipment (UE) with a network slice supported by one or more network entities, the method performed by a UE and comprising:

sending a first random number, and subscriber-related information identifying the UE, to at least one of the one or more network entities;

receiving a second random number from at least one of the one or more network entities; and generating a temporary network slice identifier at the UE, the temporary network slice identifier generated based on the first random number, the second random number, and subscriber-related information;
wherein the temporary network slice identifier is used for attaching the UE to a network slice associated with a network slice identifier-, and the temporary network slice identifier generated at the UE has a one-to-one mapping with a temporary network slice identifier generated at the at least one of the one or more network entities.

2. The method of claim 1, further comprising sending the network slice identifier identifying the network slice to which the UE wishes to attach to the at least one network entity;
wherein generating the temporary network slice identifier at the UE further comprises:
generating the temporary network slice identifier at the UE based on the first random number, the second random number, the subscriber-related information and the network slice identifier.

3. The method of claim 2, wherein using the temporary network slice identifier to attach the UE to a network slice comprises maintaining a relationship between the temporary network slice identifier and the network slice identifier identifying the network slice to which the UE is to be attached.

4. The method of claim 1, further comprising repeating, a plurality of times, the steps of:
sending, receiving and generating so as to generate a plurality of temporary network slice identifiers at the UE, and using each of the plurality of temporary network slice identifiers to attach the UE to a respective one of a corresponding plurality of network slices.

5. The method of claim 1, wherein using the temporary network slice identifier to attach the UE to the network slice comprise receiving an authentication vector from at least one of the one or more network entities to perform authentication and key agreements (AKA) authentication.

6. The method of claim 1, further comprising generating the first random number at the UE.

7. The method of claim 1, further comprising:
in response to attaching the UE to the network slice, generating at the UE a new first random number;
sending the new first random number and subscriber-related information identifying the UE to at least one of the one or more network entities;
receiving a new second random number from at least one of the one or more network entities; and
generating a new temporary network slice identifier at the UE for use in attaching the UE to the network slice, wherein the new temporary network slice identifier is based on the new first random number, the new second random number, and the subscriber-related information.

8. A method for attaching user equipment (UE) with a network slice supported by one or more network entities, the method performed by at least one of the one or more network entities and comprising:
receiving, at the network entity, a first random number, and subscriber-related information identifying the UE, from the UE; and
generating a temporary network slice identifier at the at least one network entity, wherein the temporary network slice identifier is generated based on the first random number, a second random number, and subscriber-related information;
wherein the temporary network slice identifier is used for attaching the UE to a network slice associated with a network slice identifier, and the temporary network slice identifier generated at the at least one of the one or more network entities has a one-to-one mapping with a temporary network slice identifier generated at the UE.

9. The method of claim 8, further comprising generating the second random number in response to receiving the first random number, and the subscriber-related information identifying the UE, from the UE.

10. The method of claim 8, further comprising allocating a default network identifier identifying a default network slice to the UE, and wherein using the temporary network slice identifier to attach the UE to the network slice comprises attaching the UE to the default network slice.

11. The method of claim 8, further comprising, at the at least one network entity, receiving a network slice identifier identifying the network slice to which the UE wishes to attach;
wherein the temporary network slice identifier at the UE is based on the first random number, the second random number, the subscriber-related information and the network slice identifier.

12. The method of claim 8, wherein receiving the first random number, and the subscriber-related information identifying the UE comprises receiving the first random number, and subscriber-related information identifying the UE at a network slice management function (NSMF) entity.

13. The method of claim 12, wherein generating a temporary network slice identifier at the at least one network entity based on the first random number, the second random number, and the subscriber-related information comprises generating a temporary network slice identifier at an authentication server function (AUSF) coupled to the NSMF.

14. A method for attaching user equipment (UE) with a network slice supported by one or more network entities, the method comprising:
sending a first random number, and subscriber-related information identifying the UE, from the UE to at least one of the one or more network entities;
sending a second random number from at least one of the one or more network entities to the UE;
generating a temporary network slice identifier at the UE and at the at least one of the one or more network entities based on the first random number, the second random number, and subscriber-related information, wherein the temporary network slice identifier generated at the UE has a one-to-one mapping with the temporary network slice identifier generated at the at least one network entity; and
using the temporary network slice identifier to attach the UE to a network slice associated with a network slice identifier.

15. The method of claim 14, further comprising generating the first random number at the UE.

16. The method of claim 14, further comprising generating the second random number at the at least one of the one or more network entities.

17. The method of claim 16, further comprising generating the second random number at the same network entity that generates the temporary network slice identifier.

18. The method of claim 16, further comprising generating the first random number at the UE using a parameter generation algorithm, and generating the second random number at the at least one network entity using the same or another parameter generation algorithm.

19. The method of claim 14, wherein sending the first random number, and subscriber-related information identifying the UE, from the UE to at least one of the one or more network entities comprises sending the first random number, and subscriber-related information identifying the UE to a network slice management function (NSMF) entity.

20. A non-transitory computer readable non-transitory storage medium comprising a program for a computer configured to cause a processor to perform the method of claim 1.

* * * * *